US007110564B2

(12) United States Patent
Son

(10) Patent No.: US 7,110,564 B2
(45) Date of Patent: *Sep. 19, 2006

(54) MULTI-FUNCTION ACTUATOR

(75) Inventor: Yeon Ho Son, Suwon-Shi (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 453 days.

This patent is subject to a terminal disclaimer.

(21) Appl. No.: 10/005,264

(22) Filed: Nov. 12, 2001

(65) Prior Publication Data

US 2003/0044031 A1 Mar. 6, 2003

(30) Foreign Application Priority Data

Aug. 22, 2001 (KR) .............................. 2001-50537

(51) Int. Cl.
*H04R 1/00* (2006.01)
*H04B 3/36* (2006.01)

(52) U.S. Cl. .................. 381/396; 381/151; 340/407.1; 340/388.1

(58) Field of Classification Search ........ 381/400–401, 381/99, 182, 396, 372, 150–151, 412, 420; 455/90, 567; 340/388.1, 407.1; 335/222–223
See application file for complete search history.

(56) References Cited

U.S. PATENT DOCUMENTS

| | | | | |
|---|---|---|---|---|
| 5,894,263 | A * | 4/1999 | Shimakawa et al. | 340/388.1 |
| 6,208,237 | B1 * | 3/2001 | Saiki et al. | 340/388.1 |
| 6,211,775 | B1 * | 4/2001 | Lee et al. | 340/407.1 |
| 6,466,682 | B1 * | 10/2002 | An | 381/413 |
| 6,487,300 | B1 * | 11/2002 | Lee et al. | 381/396 |
| 6,560,347 | B1 * | 5/2003 | Chung | 381/420 |
| 6,608,541 | B1 * | 8/2003 | Shiraki et al. | 335/222 |
| 2002/0061115 | A1 * | 5/2002 | Chung et al. | 381/398 |
| 2002/0076068 | A1 * | 6/2002 | Chung | 381/150 |
| 2002/0122560 | A1 * | 9/2002 | An | 381/150 |
| 2003/0036364 | A1 * | 2/2003 | Chung | 455/90 |

FOREIGN PATENT DOCUMENTS

JP 10-014195 A 1/1998

(Continued)

OTHER PUBLICATIONS

Alden, Ray. Radio Shack: "Advanced Speaker Systems, How to Design and Build High-Tech Computer-Desiged Speaker Systems" c1995, Master Publishing, Inc., pp. 71-86.*

(Continued)

*Primary Examiner*—Sinh Tran
*Assistant Examiner*—Phylesha Dabney
(74) *Attorney, Agent, or Firm*—Darby & Darby

(57) ABSTRACT

Disclosed is a multi-function actuator comprising: a case having an internal space; a vibrating coil installed in the case for generating vibration; a diaphragm for generating sound with an outer end being fixed to the upper end of the case; a voice coil fixedly installed in the bottom of the diaphragm for generating sound according to a sound source and having an notch filter; a vertically magnetized magnet; an upper plated attached to the magnet for constituting a magnetic circuit; a yoke for constituting the magnetic circuit together with the magnet; a weight for constituting a vibrator body together with the magnet, the upper plate and the yoke; and a suspension spring for supporting the vibrator body. In generating sound, sound quality is improved without influencing sound while vibration is reduced.

19 Claims, 5 Drawing Sheets

FOREIGN PATENT DOCUMENTS

| | | | | |
|---|---|---|---|---|
| JP | 10-014195 | A | * | 1/1998 |
| JP | 10-117472 | A | | 5/1998 |
| JP | 10-229596 | A | | 8/1998 |
| JP | 10-229596 | A | * | 8/1998 |

OTHER PUBLICATIONS

Alden, Ray. Advanced Speaker Systems: How to Design and Build High-Tech Computer-Designed Speaker Systems. Texas: Master Publishing, Inc., 1995. pp. 71-86.*

English translation of Abstract only for KR 10-1998-0022244; "Vibration Speaker".

English translation of Abstract only for KR 10-1998-0022659; "Vibration Speaker".

English translation of Abstract only for KR 10-1998-0023812; "Vibration Speaker".

English translation of Abstract only for KR 10-1998-0023815; "Vibration Speaker".

* cited by examiner

MULTI-FUNCTION ACTUATOR

This application claims the benefit of Korean Patent Application No. 2001-50537, filed Aug. 22, 2001, in the Korean Intellectual Property Office, the disclosure of which is incorporated herein by reference.

BACKGROUND OF THE INVENTION

1. Field of the Invention

The present invention relates to a multi-function actuator for performing both sound and vibration generating functions, and in particular, which can remarkably reduce vibration without influencing sound features in output of sound in the actuator.

2. Description of the Related Art

In general, a speaker is a sound generating apparatus which outputs an audible sound from an electrically or electronically received sound signal or a previously inputted bell or melody. Such speaker function has been adopted in mobile communication means such as a mobile telephone, however, causes noise in public places crowed with people. Thus, the speaker is restricted in use so as not to generate such noise. Instead, a vibration mode is frequently used for producing a call-incoming signal, and thus the necessity of a multi-function actuator is gradually increasing to meet such a function.

In the latest, accordingly, development has been actively made about the multi-function actuator which can faithfully perform basic functions while reducing the spatial size through integration of components such as a vibration motor, buzzer, receiver, speaker and the like.

However, the relative degradation of function is inevitably incurred in order to enable several functions, and accordingly various methods are being attempted to overcome the degradation. In particular, since a vibration function is executed by a vibration structure for generating vibration through resonance of a vibrator which is dependent from a spring, vibration is created even in output of sound.

Accordingly, the present invention is proposed to provide a multi-function actuator which has such a structure that can be used without great influence to sound and vibration output.

Hereinafter, detailed description will be made about the structure of a typical multi-function actuator of the prior art in reference to FIG. 1.

As shown in FIG. 1, the typical multi-function actuator comprises a case 10 with an internal space; a sound-generating diaphragm 1 with an outer end fixed to the upper end of the case 10; a voice coil 2 fixedly wound around the lower end of the diaphragm 1; a vertically magnetized magnet 4; an upper plate 3 attached to the magnet 4 for constituting a magnetic circuit; a yoke 5 for constituting the magnetic circuit together with the magnet 4; a weight 6 for constituting a vibrator body together with the upper plate 3 and the yoke 5; upper and lower suspension springs 7 and 8 for respectively supporting the vibrator body at upper and lower positions; and a vibrating coil 9 arranged on a grill 11 at the bottom of the case 10 for generating vibration.

The vibrating coil 9 is additionally provided as above so that a current is externally applied through lead lines 14 to 17. In this case, a method is adapted in which the four lines are connected to signal sources. Typically, the lines are connected to the signal sources designated as +, −, + and −.

Therefore, in the foregoing structure, when the current is applied through the lead lines 14 and 15, an electromagnetic force is generated to the voice coil 2 in the magnetic circuit constituted by the upper plate 3, the vertically magnetized magnet 4 and the yoke 5.

In other words, a magnetic field is produced to the voice coil 2 in the magnetic circuit constituted by the upper plate 3, the vertically magnetized magnet 4 and the yoke 5, in which a magnetic line from the N pole of the magnet 4 faces again to the S pole of the magnet through the upper plate 3, the voice coil 2 and the yoke 5 in sequence to produce the magnetic field. In this case, the voice coil 2 executes a speaker function by using a magnetic flux of the magnetic circuit due to the magnetic field.

Meanwhile, the yoke 5 is thinner in the lower part than in the side so that the magnetic flux partially leaks toward the vibrating coil 9 positioned at the bottom. The leaked magnetic flux incurs an electromagnetic force to the vibrating coil 9 when the current is applied through the lead lines 16 and 17.

In other words, the typical multi-function actuator in the prior art has the voice coil in a magnetic circuit unit at the diaphragm side so that the voice coil is applied with the signal when outputting sound. The lower magnetic circuit has the vibrating coil so that the lower coil is applied with the current when generating vibration.

In this case, in vibration of the multi-function actuator, the resonance frequency exists in the band of 100 to 200 Hz and the sound is outputted in the frequency band at least 350 Hz, and thus sound output can be considered regardless of vibration output due to the difference in band. However, since sound is obtained using an FM modulation mode in practice, sometimes the resonance frequency is simultaneously inputted in generating vibration different from the original intention so that the amount of vibration in the sound mode may be as large as in the vibration mode.

SUMMARY OF THE INVENTION

Accordingly, the present invention has been made to solve the foregoing problems in the prior art and it is an object of the invention to provide a structure which can intercept frequencies in specific range to improve sound quality while reducing vibration in sound generation without influencing sound.

DESCRIPTION OF THE PREFERRED EMBODIMENTS

In order to obtain the foregoing object, the present invention is characterized in providing a multi-function actuator including a structure capable of interrupting frequencies in specific ranges when signals are applied to a vibrating coil and a voice coil.

According to the invention, it is provided a multi-function actuator comprising: a case having an internal space; a vibrating coil installed in the case for generating vibration; a diaphragm for generating sound with an outer end being fixed to the upper end of the case; a voice coil fixedly installed in the bottom of the diaphragm for generating sound according to a sound source and having an notch filter; a vertically magnetized magnet; an upper plated attached to the magnet for constituting a magnetic circuit; a yoke for constituting the magnetic circuit together with the magnet; a weight for constituting a vibrator body together with the magnet, the upper plate and the yoke; and a suspension spring for supporting the vibrator body.

In other words, the invention relates to the multi-function actuator separately comprising the voice coil and the vibrating coil, in which an electromagnetic force is generated at both sides of the vibrating coil when a low-frequency current is applied so as to excite a vertical motion of the vibrator body constituted by the magnet, the upper plate, the yoke and the weight generating a vibration signal, and the electromagnetic force is generated at the voice coil in the magnetic circuit constituted by the upper plate, the vertically magnetized magnet and the yoke when a high-frequency current is applied so as to obtain sound output, by which lower frequencies in specific ranges are interrupted to improve sound quality without influencing sound while reducing vibration in sound generation.

Hereinafter, detailed description will be made about the first embodiment of the invention in reference to FIGS. 2 and 3.

Figure 1:
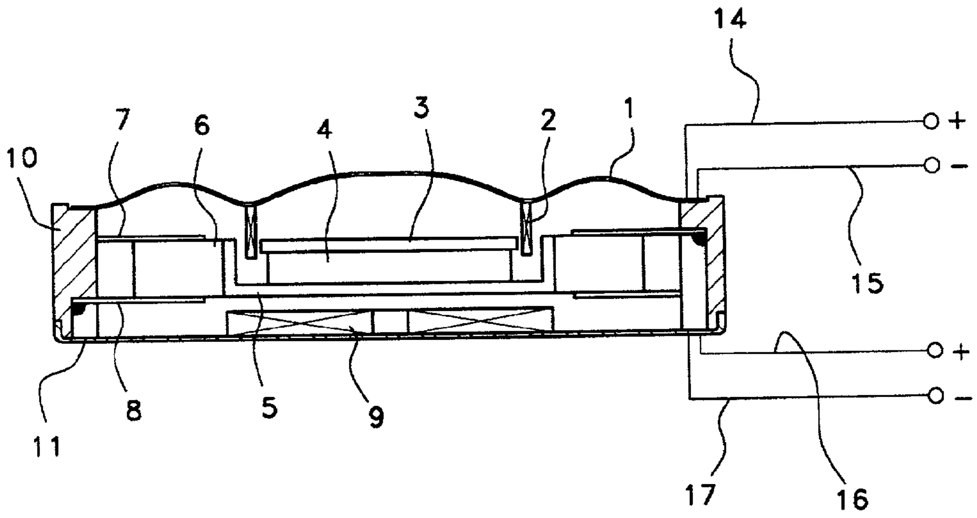
FIG. 1 a conceptual view of a general multi-function actuator.
Figure 2:
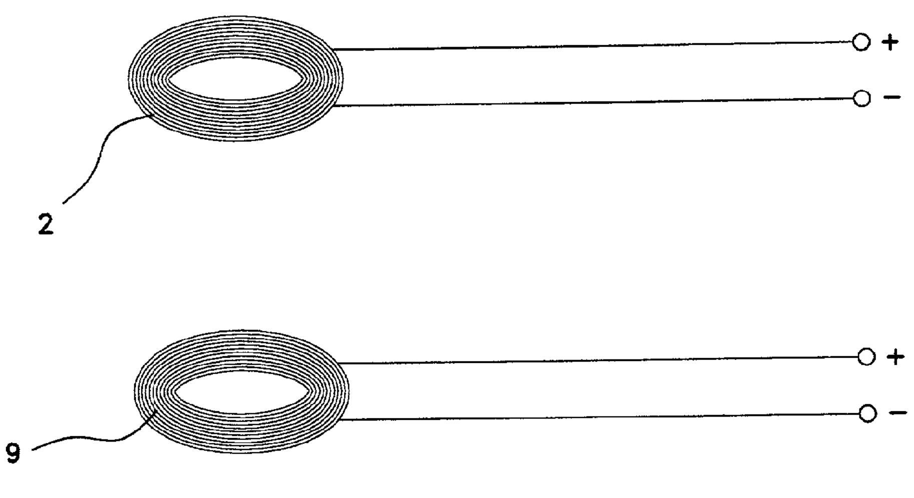
FIG. 2 shows power connecting parts of a voice coil and a vibrating coil of the general multi-function actuator.
Figure 3:
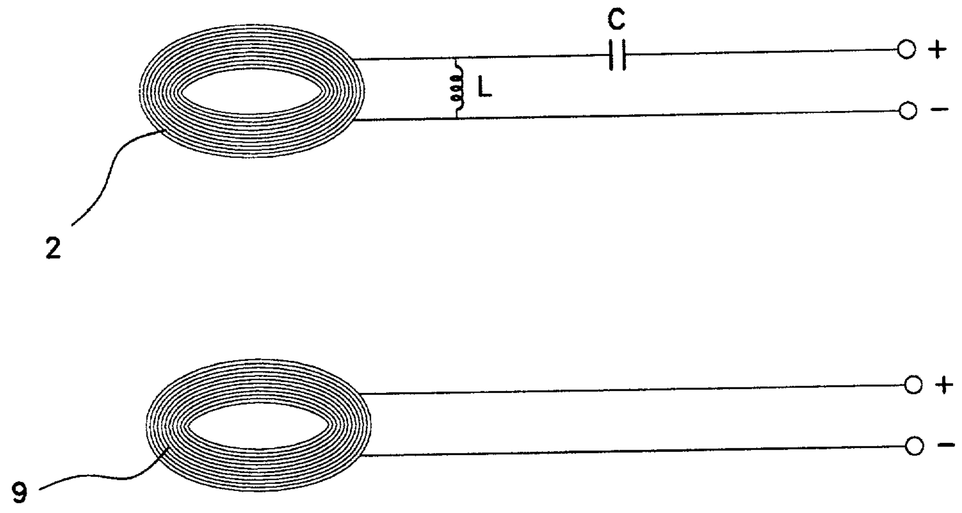
FIG. 3 shows the first embodiment of a multi-function actuator of the invention.

As shown in FIGS. 2 and 3, a multi-function actuator according to the first preferred embodiment of the invention comprises a case 10 having an internal space; a vibrating coil 9 installed in the case 10 for generating vibration; a sound-generating diaphragm 1 with an outer end fixed to the upper end of the case 10; a voice coil 2 fixedly installed under the diaphragm 1 for generating sound according to a sound source and including a high-pass filter; a vertically magnetized magnet 4; an upper plate 3 attached to the magnet 4 for constituting a magnetic circuit; a yoke 5 for constituting the magnetic circuit together with the magnet 4; a weight 6 for constituting a vibrator body together with the magnet 4, the upper plate 3 and the yoke 5; and suspension springs 7 and 8 for supporting the vibrator body.

In particular, the high-pass filter is constituted by an inductor L and a capacitor C for more preferable execution of the invention. More preferably, the inductor L is connected in parallel and the capacitor C in series, and the high-pass filter is adapted to interrupt frequencies of less than 500 Hz.

Figure 4:
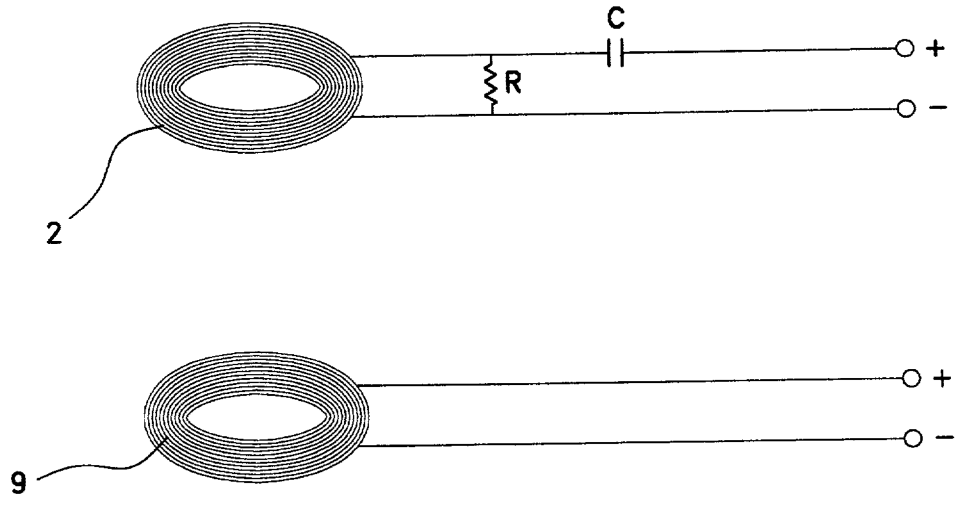
FIG. 4 shows the second embodiment of a multi-function actuator of the invention.

Also, according to the second embodiment of the invention, as shown in FIG. 4, the high-pass filter can be constituted by a resistor R and a capacitor C. In such a structure, the high-pass filter can be constituted by an RC second coupled circuit with the resistor R being connected in parallel and the capacitor C in series.

As the second embodiment of the invention, the high-pass filter can be constituted by the resistor and the capacitor. In such a structure, the resistor R and the inductor L are respectively connected in parallel and the capacitor C is connected in series, which can be seen in FIG. 4.

Figure 5:
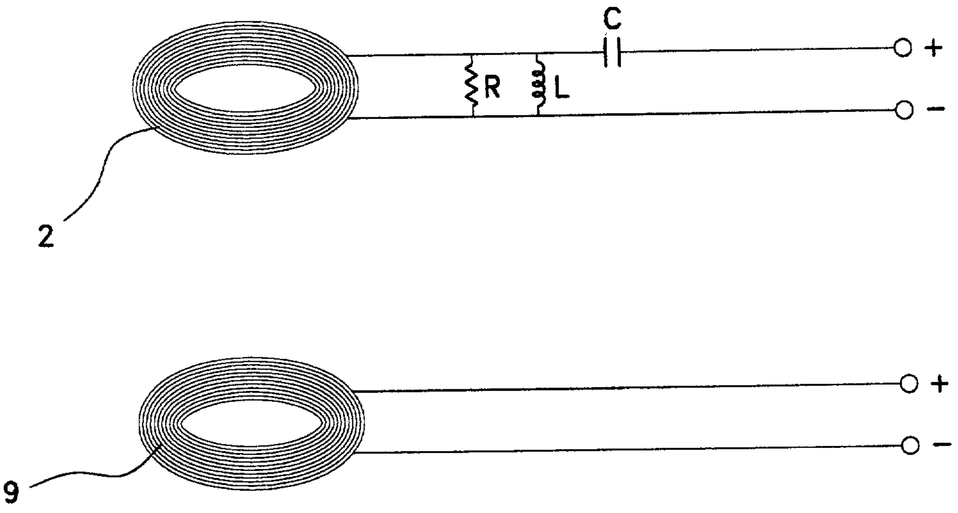
FIG. 5 shows the third embodiment of a multi-function actuator of the invention.
Figure 6:
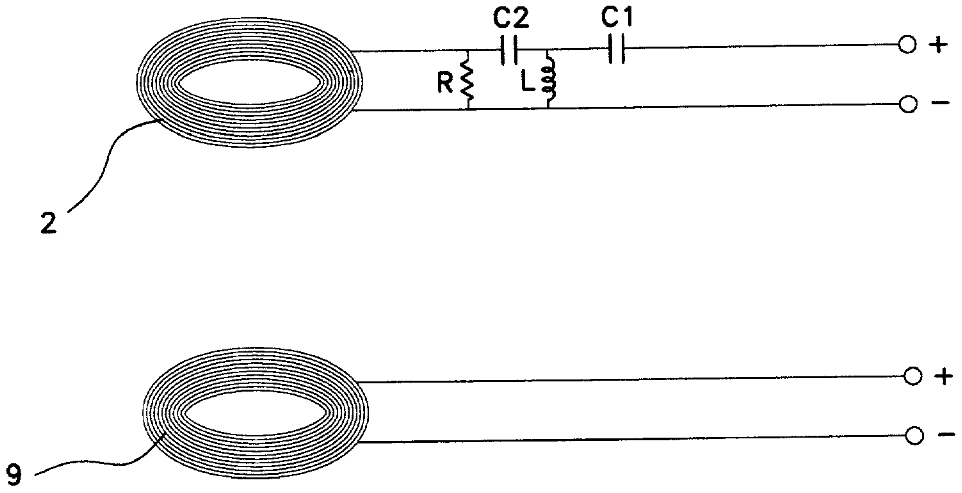
FIG. 6 shows the fourth embodiment of a multi-function actuator of the invention.
Figure 7:
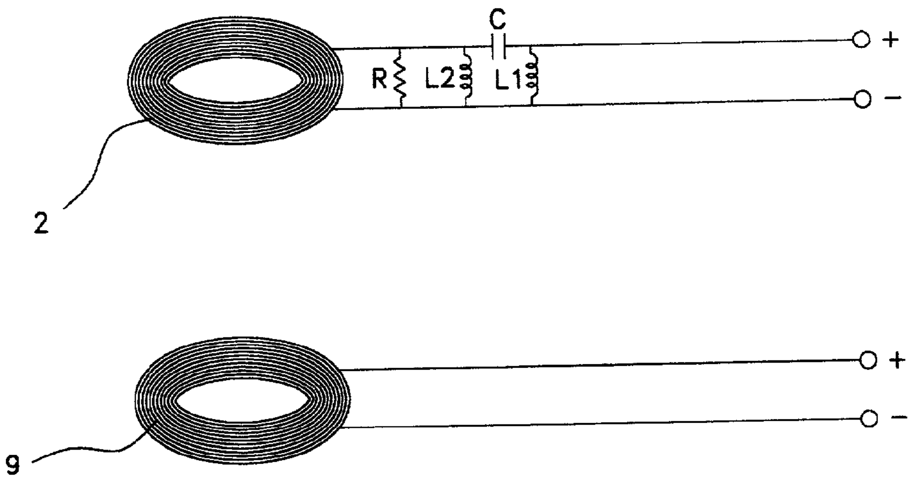
FIG. 7 shows the fifth embodiment of a multi-function actuator of the invention.

FIG. 5 shows a high-pass filter constituted by a reverse L-type circuit with a resistor R and an inductor L being respectively connected in parallel and a capacitor in series according to the third embodiment of the invention. FIG. 6 shows a high-pass filter constituted by a T-type circuit with a resistor R and an inductor being respectively connected in parallel and capacitors C1 and C2 being mutually connected in series according to the fourth embodiment of the invention. Also, FIG. 7 shows a high pass filter constituted by a π-type circuit with a resistor R and two inductors L1 and L2 being respectively connected in parallel and a capacitor C in series.

Figure 8:
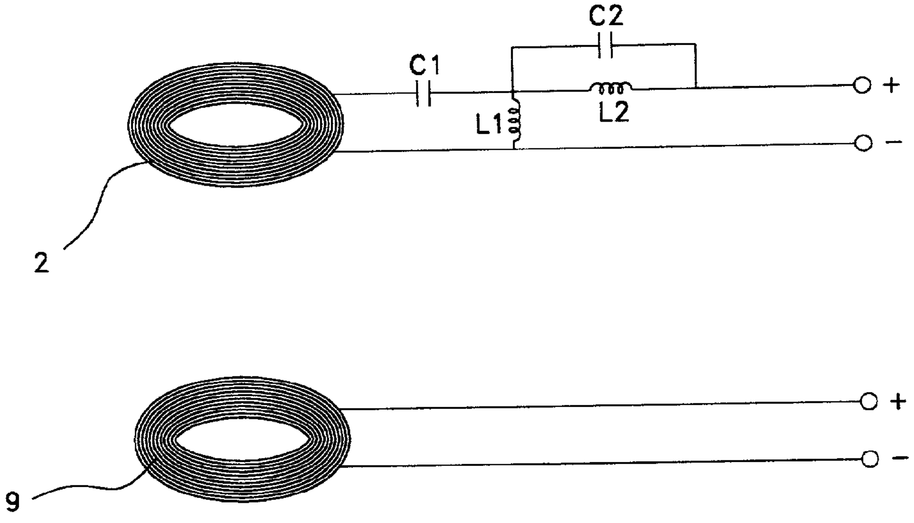
FIG. 8 shows the sixth embodiment of a multi-function actuator of the invention.

Also, as shown in FIG. 8, a structure can be obtained according to the sixth embodiment of the invention, which is constituted by two inductors and two capacitors with the ones of the inductors and the capacitors being respectively connected to the voice coil in series and the other ones of the inductors and the capacitors being mutually connected in series and then to a positive terminal of a power source.

The high-pass filter of the invention is characterized to interrupt the frequencies of or less than 500 Hz. For the purpose of this, the high-pass filter is determined in frequency according to Equation 1 expressed as follows:

$$f = \frac{1}{2\pi\sqrt{LC}}, \qquad \text{Equation 1}$$

herein, L means inductance of inductor and C means capacitance of capacitor.

As described hereinbefore, the invention separately comprises the voice coil 2 and the vibrating coil 9 having the high-pass filter so that an electromagnetic force is generated at both sides of the vibrating coil 9 through the lead lines 16 and 17 when a low-frequency current is applied resultantly exciting a vertical motion to the vibrator body constituted by the magnet 4, the upper plate 3, the yoke 5 and the weight 6 to generate a vibration signal.

Also, when a high-frequency current is applied through the lead lines 14 and 15, the high-pass filter constituted as above can interrupt low frequencies in the specific range thereby reducing vibration in sound generation. In this case, the operation of the multi-function actuator is as above since sound output is executed by an electromagnetic force generated to the voice coil 2 in the magnetic circuit constituted by the upper plate 3, the magnet 4 and the yoke 5.

As a method capable of interrupting the frequencies in the specific range in applying the signal to the vibrating coil and the voice coil, a configuration using a notch filter having a high-pass filter and a low-pass filter connected in succession can be proposed in addition to a method of using the high-pass filter as described before. The multi-function actuator adopting the notch filter will be described as the seventh embodiment of the invention.

Figure 9:
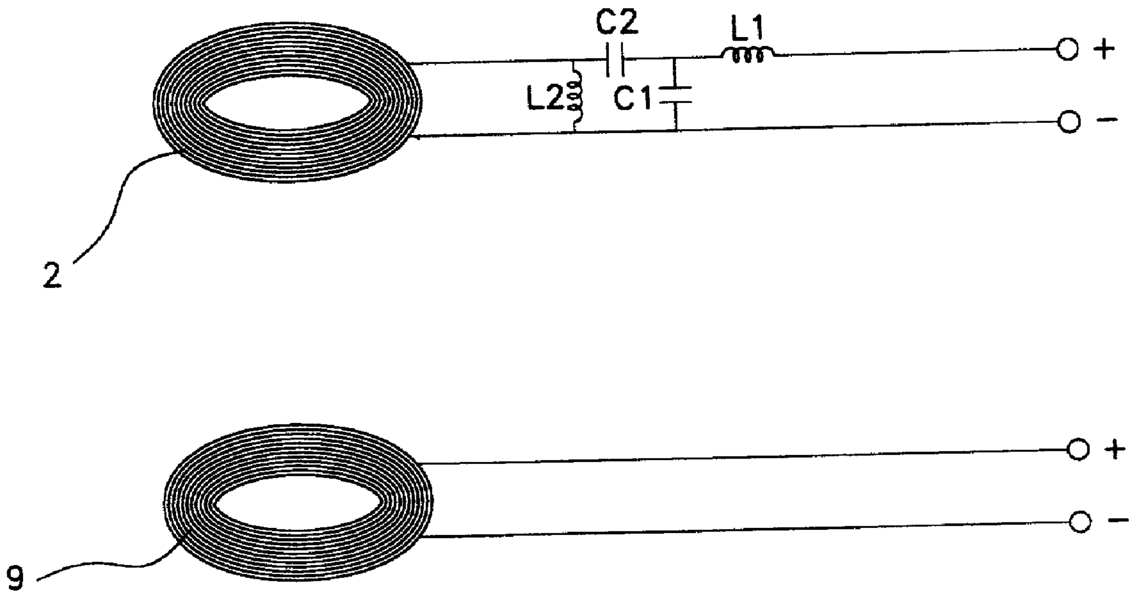
FIG. 9 shows the tenth embodiment of a multi-function actuator of the invention.

The multi-function actuator according to the seventh embodiment of the invention, as shown in FIGS. 2 and 9, is characterized in comprising a case 10 having an internal space; a vibrating coil 9 installed within the case 10 for generating vibration; a diaphragm 1 with an outer end fixed to the upper end of the case 10; a voice coil 2 fixedly installed in the bottom of the diaphragm 1 for generating sound according to a signal source and including a notch filter; a vertically magnetized magnet 4; an upper plate 3 attached to the magnet 4 for constituting a magnetic circuit;

a yoke 5 for constituting the magnetic circuit together with the magnet 4; a weight 6 for constituting a vibrator body together with the magnet 4, the upper plate 3 and the yoke 5; and suspension springs 7 and 8 for supporting the vibrator body.

The seventh embodiment of the invention as described above is characterized by the notch filter having the high-pass filter and the low-pass filter mutually connected in series, in which the high-pass filter has a capacitor C2 connected in series and an inductor L2 in parallel and the low-pass filter has a capacitor Cl connected in parallel and an inductor L1 in series.

The high-pass filter and the low-pass filter constituting the notch filter are characterized in respectively having the interrupting frequency range of 100 to 500 Hz, which allows only the components in the desired frequency range to pass through the filters thereby improving sound quality without influencing sound while reducing vibration in generating sound.

The invention can be applied to various fields which can adopt the same principle such as a micro-speaker which is fundamental to the operation principle of the multi-function actuator. When both the voice coil and the vibrating coil are provided, only the components in the desired frequency range are passed so that sound quality can be improved without influencing sound while reducing vibration.

It should be understood that the foregoing structures according to the embodiment of the invention are illustrative only, and variations and modifications will be apparent to those skilled in the art from the scope and basic principle of the invention defined in the following claims.

What is claimed is:

1. A multi-function actuator comprising:

a case having an internal space;

a vibrating coil installed in said case for generating vibration;

a diaphragm for generating sound with an outer end being fixed to the upper end of said case;

a voice coil fixedly installed in the bottom of said diaphragm for generating sound according to a sound source and having an notch filter;

a vertically magnetized magnet;

an upper plated attached to said magnet for constituting a magnetic circuit;

a yoke for constituting the magnetic circuit together with said magnet;

a weight for constituting a vibrator body together with said magnet, said upper plate and said yoke; and a suspension spring for supporting said vibrator body.

2. The multi-function actuator according to claim 1, wherein said notch filter of said voice coil has a frequency range of 100 to 500 Hz.

3. The multi-function actuator according to claim 1, wherein said notch filter of said voice coil is integrally comprised in the inside thereof.

4. The multi-function actuator according to claim 1, wherein said vibrating coil is arranged on a grill in said case.

5. A multi-function actuator comprising:

a case having an internal space;

a vibrating coil installed in said case for generating vibration;

a diaphragm for generating sound with an outer end being fixed to the upper end of said case;

a voice coil fixedly installed in the bottom of said diaphragm for generating sound according to a sound source and having a high-pass filter;

a vertically magnetized magnet;

an upper plated attached to said magnet for constituting a magnetic circuit;

a yoke for constituting the magnetic circuit together with said magnet;

a weight for constituting a vibrator body together with said magnet, said upper plate and said yoke; and a suspension spring for supporting said vibrator body.

6. The multi-function actuator according to claim 5, wherein said high-pass filter comprises an inductor and a capacitor.

7. The multi-function actuator according to claim 6, wherein said inductor is connected in parallel and said capacitor is connector is series.

8. The multi-function actuator according to claim 5, wherein said high-pass filter interrupts frequencies of under 500 Hz.

9. The multi-function actuator according to claim 5, wherein said high-pass filter comprises a resistor and a capacitor.

10. The multi-function actuator according to claim 9, wherein said high-pass filter is an RC second coupled circuit that is characterized that said resistor is connected in parallel and said capacitor is connected in series.

11. The multi-function actuator according to claim 5, wherein said high-pass filter comprises a resistor, a inductor and a capacitor.

12. The multi-function actuator according to claim 11, wherein said high-pass filter is characterized that said resistor and said inductor are respectively connected in parallel and said capacitor is connected in series.

13. The multi-function actuator according to claim 12, wherein said high-pass filter is a reverse L-type circuit that is characterized that said resistor and said inductor are respectively connected in parallel and said capacitor is connected in series.

14. The multi-function actuator according to claim 12, wherein said high-pass filter is a T-type circuit that is characterized that said resistor and said inductor are respectively connected in parallel and said capacitors are connected in series and the number of said capacitors is two.

15. The multi-function actuator according to claim 12, wherein said high-pass filter is a π-type circuit that is characterized that said resistor and said inductors are respectively connected in parallel and said capacitor is connected in series and the number of said inductors is two.

16. The multi-function actuator according to claim 5, wherein said high-pass filter of said voice coil is integrally included therein.

17. The multi-function actuator according to claim 5, wherein said vibrating coil is installed on a grill in said case.

18. The multi-function actuator according to claim 6, further comprising a second inductor and a second capacitor.

19. The multi-function actuator according to claim 18, wherein ones of said inductors and said capacitors are respectively connected in series to said voice coil, and the other ones of said inductors and said capacitors are mutually connected in series and connected to a positive terminal of a power source.

* * * * *